(12) United States Patent
Chung et al.

(10) Patent No.: US 9,060,393 B1
(45) Date of Patent: Jun. 16, 2015

(54) LIGHT CONTROL SYSTEM ADDED SECURITY FUNCTION BASED ON CPTED AND METHOD THEREOF

(71) Applicant: BEST DIGITAL CO., LTD., Uiwang-si (KR)

(72) Inventors: Kyung Ho Chung, Gwangmyeong-si (KR); Jae Yong Park, Anyang-si (KR); Young Suk Park, Anyang-si (KR)

(73) Assignee: BEST DIGITAL CO. LTD., Uiwang-si, Gyeonggi-do (KR)

(*) Notice: Subject to any disclaimer, the term of this patent is extended or adjusted under 35 U.S.C. 154(b) by 0 days.

(21) Appl. No.: 14/091,910

(22) Filed: Nov. 27, 2013

(51) Int. Cl.
*H05B 37/02* (2006.01)
*F21V 23/04* (2006.01)

(52) U.S. Cl.
CPC ........ *H05B 37/0227* (2013.01); *H05B 37/0245* (2013.01); *F21V 23/0471* (2013.01); *F21V 23/0478* (2013.01)

(58) Field of Classification Search
CPC ........... H05B 37/0272; H05B 37/0218; H05B 33/0842; H05B 33/0845; H05B 37/029; H05B 37/02; H05B 37/0254; Y02B 20/44; Y02B 20/46; Y04S 20/246
USPC ........... 315/158, 86, 113, 151, 152, 201, 294, 315/297, 307, 312; 362/231, 233, 272, 286
See application file for complete search history.

(56) References Cited

U.S. PATENT DOCUMENTS

| | | | | |
|---|---|---|---|---|
| 5,031,082 | A * | 7/1991 | Bierend | 362/233 |
| 6,542,270 | B2 * | 4/2003 | Perkins et al. | 398/140 |
| 7,439,847 | B2 * | 10/2008 | Pederson | 340/5.81 |
| 8,100,552 | B2 * | 1/2012 | Spero | 362/231 |
| 8,139,113 | B2 * | 3/2012 | McCormack | 348/143 |
| 8,143,811 | B2 * | 3/2012 | Shloush et al. | 315/297 |
| 8,339,274 | B2 * | 12/2012 | Van De Sluis et al. | 340/686.1 |
| 8,571,411 | B2 * | 10/2013 | Pederson et al. | 398/115 |
| 8,791,649 | B2 * | 7/2014 | Chatelus | 315/294 |
| 2009/0237011 | A1 * | 9/2009 | Shah et al. | 315/312 |
| 2012/0139417 | A1 * | 6/2012 | Mironichev et al. | 315/86 |
| 2012/0206050 | A1 * | 8/2012 | Spero | 315/152 |
| 2012/0262575 | A1 * | 10/2012 | Champagne et al. | 348/143 |

* cited by examiner

*Primary Examiner* — Vibol Tan
(74) *Attorney, Agent, or Firm* — East West Law Group; Heedong Chae (57) ABSTRACT

The present invention relates to a lighting control system with a security function based on a CPTED, which is capable of acquiring detailed video information on a desired object in interlocking with a video device such as a DVR based on sensing information collected through sensors included a local lighting device and controlling a lighting adjacent to the object to strengthen a security function. Since lightings and cameras can be simultaneously controlled to direct a suspicious object in response to motion of the suspicious object without any separate video analysis module, the object's crime intention can be prevented and the object's video can be acquired without any shadow zone or deteriorated video quality, which can result in increased security in interlocking of the security function including CPTED-based crime prevention with the lighting control.

13 Claims, 6 Drawing Sheets

LIGHT CONTROL SYSTEM ADDED SECURITY FUNCTION BASED ON CPTED AND METHOD THEREOF

BACKGROUND OF THE INVENTION

1. Field of the Invention

The present invention relates to a lighting control system with a security function based on a CPTED (Crime Prevention Through Environmental Design) and a method thereof, and more particularly, to a lighting control system with a security function based on a CPTED, which is capable of acquiring detailed video information on a desired object in interlocking with a video device such as a DVR based on sensing information collected through sensors included a local lighting device and controlling a lighting adjacent to the object to strengthen a security function.

2. Description of the Related Art

At present, lamps including fluorescent lamps, incandescent lamps, LEDs and the like are installed in different sites in collective buildings and systems for managing a number of lightings effectively are being settled in concert with recent energy saving policies. Accordingly, a scheme of connecting a plurality of lightings to a small number of lighting control servers via a communication line and inputting a control command to the lighting control servers to manage the plurality of lightings integrally instead of directly controlling the individual lightings is being used.

In recent years, such a lighting integrated management system is not limited to a simple dimming control function for energy saving, but advances have been made toward providing a more efficient system by controlling lightings based on an event in interlocking with a variety of systems.

As one example, there has been proposed a system in which a lighting control server controls a lighting in response to sensing of an object in interlocking with a DVR. In this system, when the DVR provides a position at which the object is sensed by a camera to the lighting control server, the lighting control server performs dimming control for a lighting corresponding to the position of the object in order to provide increased energy saving efficiency.

Recently, this system is being extended to a system for associating a separate video analysis module with the DVR. That is, this system is a system in which, when the video analysis module analyzes a video collected in the DVR and an event corresponding to a preset event setting is generated, control information used to control a lighting with a function corresponding to the event is provided to the lighting control server and the lighting control server controls the lighting according to the function corresponding to the received control information.

Such a system configuration can make it possible to implement a CPTED (Crime Prevention Through Environmental Design) intended to prevent crimes through a built environment design being recently considered in architectural designs while securing an efficient lighting control function for energy saving. That is, it is possible to provide a multi-purpose system capable of providing an energy saving function and a crime prevention function by controlling lightings in response to motion of a suspicious object through video analysis in the system constructed in a building.

However, such a multi-purpose system requires increased system construction costs due to an additional separate video module. In addition, when this system is applied to a place where lightings are installed, if a DVR operated separately from a lighting control server is constructed, this leads to increased unnecessary costs due to the additional DVR interlocking with the lighting control server.

In addition, in case of a system for controlling lightings based on videos collected from cameras, a shadow zone may take happen since shooting locations of the cameras remain fixed. In addition, since the number of cameras cannot be unlimitedly increased, a video obtained in a particular zone may have a low video quality or a shadow zone depending on camera arrangement and locations and accordingly, a proper security function through the lighting control does not work well.

To overcome these problems, there appears a system for compensating for the shadow zone and the video quality through control of operation of cameras responding to sensors by simultaneous operation of the cameras and the sensors. However, such a system requires a separate communication line for the sensors and a separate module for analyzing sensing information and controlling the cameras, which may result in increase in system construction costs and low cost-effectiveness.

RELATED TECHNICAL DOCUMENT

Patent Document

Patent Document 1: Korean Patent Registration No. 0948195

SUMMARY OF THE INVENTION

To overcome the above problems, it is an object of the present invention to provide a system which is capable of significantly reducing system construction costs while simultaneously operating cameras and sensors and capable of securing a security function including crime prevention according to a CPTED and lighting operation with ease by controlling lightings in response to motion of a suspicious object without a separate video analysis module and acquiring a video of the object without any shadow zone and deteriorated video quality.

To achieve the above object, according to an aspect of the invention, there is provided a lighting control system with a security function based on a CPTED (Crime Prevention Through Environmental Design), including: a plurality of dimmer units which is installed in a lighting and is configured to control the lighting locally based on sensing information received from a sensor included in the lighting or control the lighting remotely according to an external control signal received via a control line for remote lighting control and transmit the sensing information, along with a lighting ID, to an external remote site via the control line for remote lighting control; and a lighting control unit configured to carry out a remote lighting control for the plurality of dimmer units according to a control signal provided via the control line for remote lighting control, determine whether or not a preset event is generated, based on the lighting ID and the sensing information provided from the dimmer units via the control line for remote lighting control, transmit the control signal for remote lighting control to one or more other lighting dimmer units based on the sensing information and a lighting ID corresponding to the sensing information when the event is generated, control a lighting adjacent to the lighting installed with a dimmer unit transmitting the sensing information serving as the basis of the event generation, and directly control a direction and resolution of a video unit corresponding to the lighting installed with the dimmer unit transmitting the sensing information serving as the basis of the event generation.

The sensor may be a single or complex sensor.

The lighting control unit may transmit a series of general-purpose control signals to the video unit including a DVR unit or a camera unit when the event is generated, and directly control a camera placed adjacent to the lighting serving as the basis of the event generation.

The lighting control unit may include a mapping table in which the lighting ID matches address information of the video unit and the lighting ID and the sensing information match the series of control signals, match the lighting ID and the sensing information transmitted from the dimmer unit with the mapping table, and transmit the series of control signal to the corresponding video unit.

The series of control signals may include adjustment information used to adjust a resolution or PTZ of a camera matching the lighting ID, and information on whether or not an alarm signal is generated.

The lighting control unit may be configured to transmit the adjustment information to the video unit, change a PTZ or resolution setting of the camera corresponding to the lighting ID, and acquire a high quality video for an object serving as the basis of event generation.

The video unit may store the high quality video.

The lighting control unit may determine different events depending on the type of the sensor and select one of control of a lighting adjacent to the lighting generating the sensing information, control of a lighting placed on a route from a position of the lighting generating the sensing information to an exit, and control of one or more adjacent lightings including light control of adjacent lightings.

The lighting control unit may control the brightness of a lighting selected according to the event generation differently from other lightings.

The lighting control unit may return the brightness of the entire lighting according to a preset initialization setting if the sensing information is not received any longer and return the video unit to a state previous to the event generation.

According to another aspect of the invention, there is provided a method of controlling a lighting with a security function based on a CPTED (Crime Prevention Through Environmental Design), including: a first step in which a lighting control server connected, via a control line for remote lighting control, to a plurality of dimmers which is installed in a lighting and is configured to control the lighting locally based on sensing information received from a sensor included in the lighting or control the lighting remotely according to an external control signal received via the control line for remote lighting control receives the sensing information, along with a lighting ID, from the dimmers via the control line for remote lighting control; a second step in which the lighting control server determines whether or not a preset event is generated, based on the lighting ID and the sensing information provided from the dimmers via the control line for remote lighting control; and a third step in which the lighting control server transmits the control signal for remote lighting control to one or more other lighting dimmers based on the sensing information and a lighting ID corresponding to the sensing information when the event is generated at the second step, controls a lighting adjacent to the lighting installed with a dimmer transmitting the sensing information serving as the basis of the event generation, and directly controls a direction and resolution of a video device corresponding to the lighting installed with the dimmer transmitting the sensing information serving as the basis of the event generation.

The third step may include a step in which the lighting control server stored with a mapping table in which the lighting ID matches address information of the video device and the lighting ID and the sensing information match a series of control signals matches the lighting ID and the sensing information serving as the basis of the event generation through the second step with the mapping table, transmits the series of control signal extracted accordingly to the corresponding video device, and directly controls a camera according to the series of control signals.

The third step may include a step in which the lighting control server adjusts a PTZ or resolution setting for the camera of the video device according to the series of control signals and stores a high quality video provided from the adjusted camera in the corresponding video device.

The third step may include a step in which the lighting control server determines different events depending on the type of the sensor and selects one of control of a lighting adjacent to the lighting generating the sensing information, control of a lighting placed on a route from a position of the lighting generating the sensing information to an exit, and control of one or more adjacent lightings including light control of adjacent lightings.

The method may further include, after the third step, a fourth step in which the lighting control server returns the brightness of the entire lighting according to a preset initialization setting if the sensing information is not received any longer and returns the video device to a state previous to the event generation.

As described above, according to an embodiment of the present invention, since the lightings and the cameras can be simultaneously controlled to direct a suspicious object in response to motion of the suspicious object without any separate video analysis module, the object's crime intention can be prevented and the object's video can be acquired without any shadow zone or deteriorated video quality, which can result in increased security in interlocking of the security function including CPTED-based crime prevention with the lighting control.

In addition, according to an embodiment of the present invention, without requiring any separate module for video analysis, established DVRs and cameras can be connected to the lighting control server as they stand to implement the security function and the lighting control function at once. In addition, new separate DVRs and cameras are not required, resulting in high compatibility and reduction in system installation costs.

Furthermore, according to an embodiment of the present invention, since the lighting can be controlled depending on the types of generated events to provide route guidance and attraction of attention, crimes can be prevented for the attraction of attention and an escape route can be guided at an emergency such as fire outbreak, thereby providing a high security function and further a later action function.

BRIEF DESCRIPTION OF THE DRAWINGS

The above and/or other aspects and advantages of the present invention will become apparent and more readily appreciated from the following description of the embodiments, taken in conjunction with the accompanying drawings of which.

DETAILED DESCRIPTION OF THE PREFERRED EMBODIMENT

Hereinafter, a lighting control system with a security function based on a CPTED according to an embodiment of the present invention will be described in detail with reference to the drawings.

Figure 1:
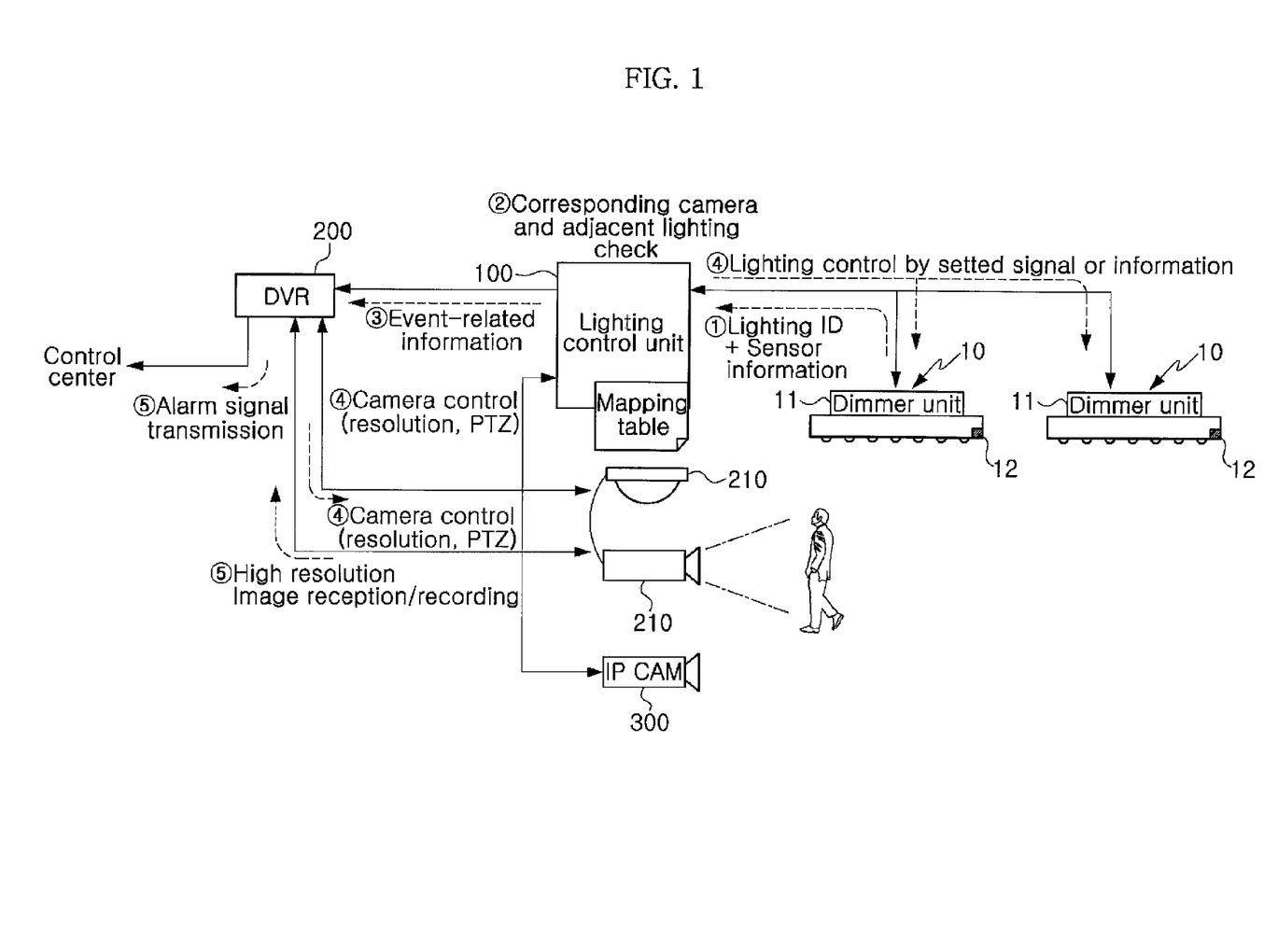
FIG. 1 is a conceptual view of a lighting control system with a security function based on a CPTED according to an embodiment of the present invention.

FIG. 1 is a conceptual view of a lighting control system with a security function based on a CPTED according to an embodiment of the present invention. Referring to FIG. 1, the lighting control system with a security function based on a CPTED may include one or more lighting units 10, each including a dimmer unit 11 for controlling dimming of a lighting and a sensor 12, a lighting control unit (lighting control server) 100 for controlling the lighting units 100 integrally, and one or more DVR units 200 which interlock with the lighting units 10 and receive and store a video from one or more cameras 210.

The lighting control unit 100 may be directly connected to one or more camera units 300 such as IP cameras supporting a network, instead of the DVR units 200. Of course, the lighting control unit 100 may be connected to general wired/wireless-enabled cameras instead of the IP cameras.

In more detail, each dimmer unit 11 can control the brightness of each lighting unit 10 autonomously based on sensing information of the sensor 12 included in each lighting unit 10 in interlocking with the sensor 12. In addition, the dimmer unit 11 may be connected to the lighting control unit 100 through a control line to receive a dimming control signal from the lighting control unit 100 and control the brightness of the lighting unit 10 according to the received dimming control signal.

In addition, the dimmer unit 11 can transmit the sensing information of the sensor 12, along with a lighting ID, to the lighting control unit 100 via the control line and the lighting control unit 100 can compare the sensing information with a preset value or a criterion and generate an event if the sensing information meets with the preset value. This can eliminate a need to construct a separate sensor-related line for facilitating an application. In this case, the lighting control unit 100 can identify the lighting unit 10 by collating the lighting ID with the DB unit 150 (see FIG. 2) included in the lighting control unit 100.

When the event is generated, the lighting control unit 100 can generate event-related information corresponding to the sensing information and directly transmit the event-related information to the DVR unit 200 or the camera unit 300. The event-related information may be upper level information on type, position, status or the like of the event according to a preset protocol. However, if a general-purpose DVR unit 200 or camera unit 300 is used, an operation according to event contents may be provided as a direct command to directly control the operation.

Figure 2:
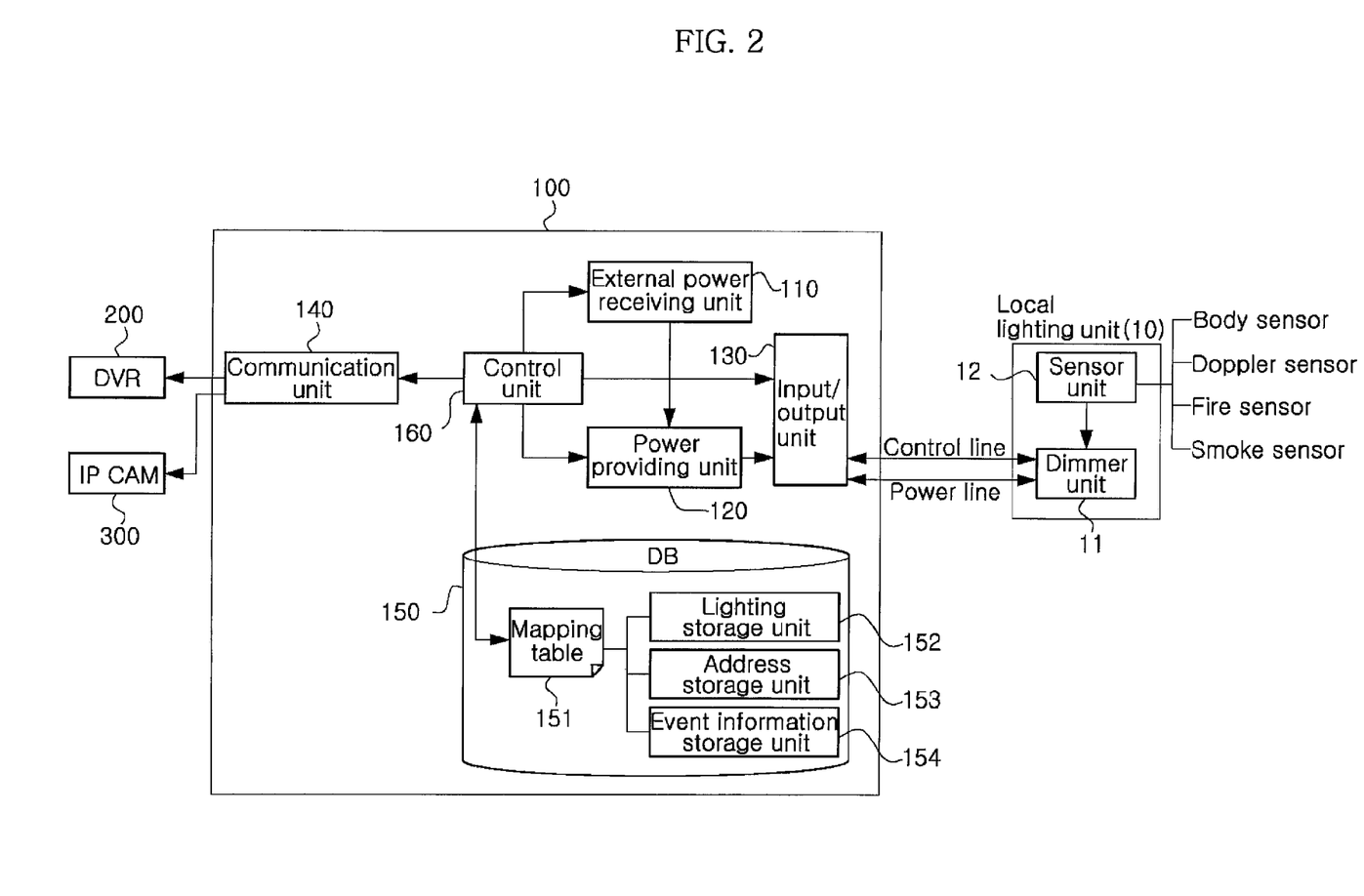
FIG. 2 is a detailed configuration view of the lighting control system of FIG. 1.

To this end, the lighting control unit 100 may store a mapping table 151 (see FIG. 151) in the DB unit 150. The mapping table 151. The mapping table 151 may include information on at least one of the DVR unit 200 and the camera unit 300 matching the lighting ID, and event-related information matching the sensing information.

Here, the event-related information may include event's generation criterion, type and position, environmental information (time, setting, weather and the like), corresponding operation contents (event transfer protocols, a series of commands for direct control, etc.) and associated lighting information (associated lighting IDs, dimming information, lighting type, lighting time, etc.)

Accordingly, the lighting control unit 100 can match the lighting ID and the sensing information with the mapping table 151 and extract channel information of the DVR unit 200 connected to the camera 210 corresponding to the lighting ID or the camera unit 300 and an event corresponding to the sensing information. Thereafter, the lighting control unit 100 can request or directly control an operation according to the event-related information based on the extracted channel information.

Accordingly, the DVR unit 200 or the camera unit 300 can receive the event-related information or a command signal and perform an operation corresponding to the event. As one example, the DVR unit 200 can be connected to at least one camera 210 such as a PTZ (Pan/Tilt/Zoom) camera, a dome camera or the like and control the camera 210 corresponding to the lighting ID based on the event-related information. In this case, cameras 210 and 300 of the DVR unit 200 or the camera unit 300 operating according to corresponding operation contents of the event-related information are preferably cameras adjacent to a lighting transmitting the sensing information.

In other words, the DVR unit 200 can acquire a high quality video for an object from the camera 210 by controlling the camera 210 to face the object sensed by the sensor through a function such as PTZ adjustment or resolution change of the camera 210 based on the event-related information.

Similarly, the camera unit 300 can operate to acquire a high quality video for the object facing the camera unit 300 through its PTZ or resolution adjustment based on the received event-related information.

In addition, The DVR unit 200 can transmit an alarm signal to an established external device or system based on the event-related information received according to an internal preset operation scheme of the DVR unit 200 in order to alarm a system manager or an external control center. Of course, this may be directly carried out by the lighting control unit 100.

Further, the lighting control unit 100 can dim one or more lightings associated with the lighting generating the sensing information based on the event-related information in order to increase illuminance for securing of a high quality video for an object or for attraction of attention and route guidance according to a security function.

In this manner, the lighting control unit 100 can acquire a high quality video for an object such as a person or vehicle sensed in a shadow zone by directly controlling cameras through the DVR unit 200 and/or the camera unit 300.

Hereinafter, an embodiment of the above-mentioned units and components will be described in more detail with reference to the drawings based on the above-described configuration.

First, referring to FIG. 2, the lighting control unit 100 may include a communication unit 140 for communication with the DVR unit 200 through a general-purpose protocol, an external power receiving unit 110 for receiving external power to be provided to the lighting unit 10, a power providing unit 120 for adjusting power received from the external power receiving unit 110 and providing the adjusted power to the lighting unit 10, an input/output unit 130 connected to the dimmer unit 11 of the lighting unit 10 via a control line and a power line, a DB unit 150 in which the mapping table 151 is stored, and a control unit 160 for controlling the above-mentioned units.

The lighting unit 10 may include the sensor unit 12, the dimmer unit 11, and a lamp unit (not shown) operated by dimming control of the dimmer unit 11.

An operation of each unit will now be described in more detail based on the above-described configuration. First, the sensor unit 12 of the lighting unit 10 can generate sensing information according to sensing of an object and provided it to the dimmer unit 11. The dimmer unit 11 can provide the sensing information to the input/output unit 130 via the control line. The control line is basically used to exchange a dimming signal and a result with the dimmer unit 11. The control line can be further used to collect the sensing information, thereby eliminating a need to provide an additional line.

In addition, the control unit 160 can receive the sensing information and a lighting ID through the input/output unit 130, compare the sensing information, the lighting ID and environmental information (time, setting, weather and the like) with a preset event status, generate an event based on a result of the comparison, and obtain information on the DVR unit 200 or the camera unit 300 connected with a camera adjacent to the lighting unit 10 corresponding to the lighting ID and corresponding operation contents corresponding to the event.

As shown in FIG. 2, the DB unit 150 includes a lighting storage unit 152 in which the lighting ID of the lighting unit 10 and position information for each lighting ID are stored, an address storage unit 153 for the DVR unit or the camera unit connected to the lighting control unit, and an event information storage unit 154 storing the event generation criterion and a corresponding operation. In the mapping table 151, information stored in the lighting storage unit 152, information stored in the address storage unit 152 and information stored in the event information storage unit 154 are mutually matched so that proper event determination and provision of the corresponding operation contents can be promptly made. Of course, although the mapping table 151 is shown to have a logical configuration, it is to be understood that the mapping table 151 may be configured in different forms and is intended to encompass various different configurations.

Figure 3:
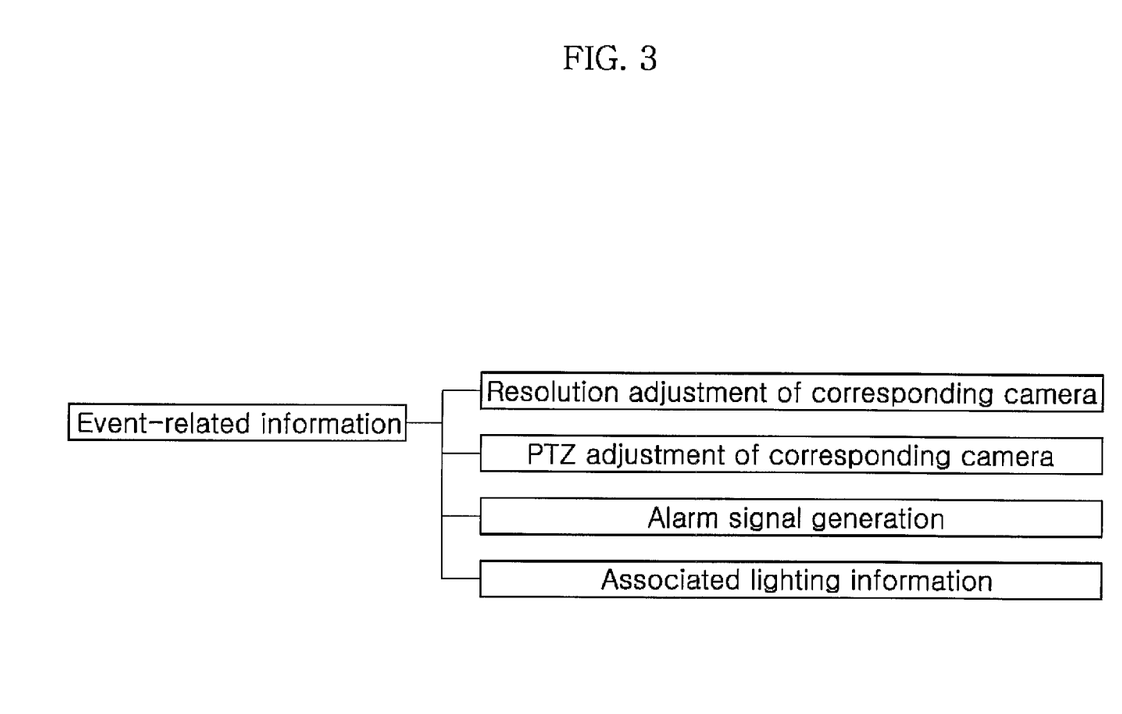
FIG. 3 is a configuration view of event-related information according to an embodiment of the present invention.

As one example of the corresponding operation contents, as shown in FIG. 3, the event-related information provided to the DVR unit 200 may include one or more of adjustment information used to adjust resolution or PTZ of a camera for each lighting ID, connected to the DVR unit 200, information related to whether or not to generate an alarm signal of the DVR unit 200, and associated lighting information including one or more different lighting IDs to be controlled in association with the lighting ID depending on an event. In addition, in a case of directly controlling the DVR unit 200 and/or the camera unit 300, corresponding operation information may further include a series of commands for specific correspondence.

The control unit 160 can extract the event-related information through the mapping table 151 and provide this information to the DVR unit 200 or can directly control the DVR unit 200 or the camera unit 300 with a general-purpose control signal. Accordingly, the lighting control unit 100 can be easily connected to the DVR unit 200 and the camera unit 300 which are established to operate independently of each other, and accordingly, it is possible to cope with a dedicated DVR unit or a general-purpose DVR unit or camera unit.

Accordingly, there is no need to install an additional separate DVR unit 200 or camera unit 300 for interlocking with the lighting control unit 100.

In particular, since different types of sensors can be selectively applied for each lighting, it is possible to easily realize prevention of dead zone, extension of usage, improvement of reliability, etc.

The above-described configuration can implement a security function in association with lighting, which will be described below with reference to FIGS. 4 and 5 based on the configuration shown in FIGS. 2 and 3.

Figure 4:
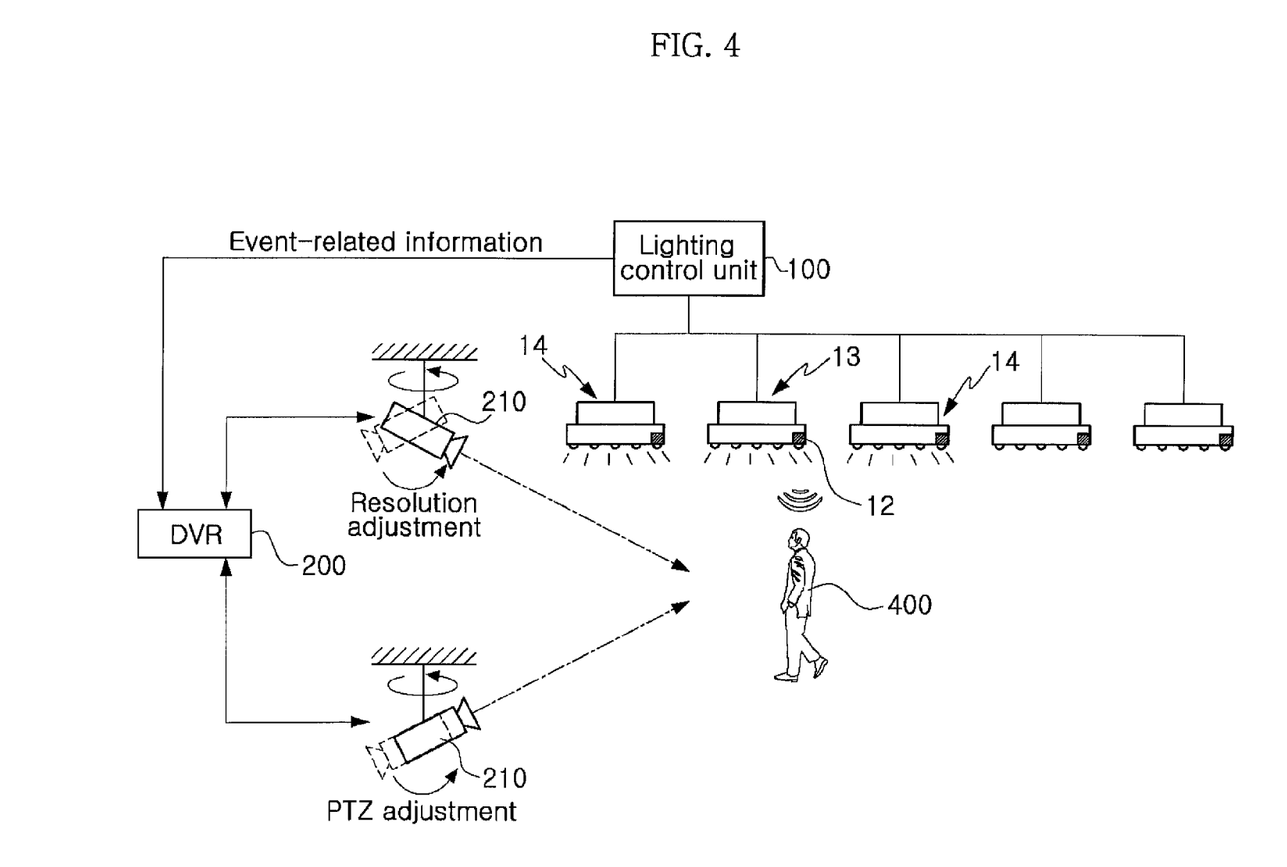
FIG. 4 is an operation conceptual view of a lighting control system with a CPTED-based security function based on an operation of a body sensor according to an embodiment of the present invention.
Figure 5:
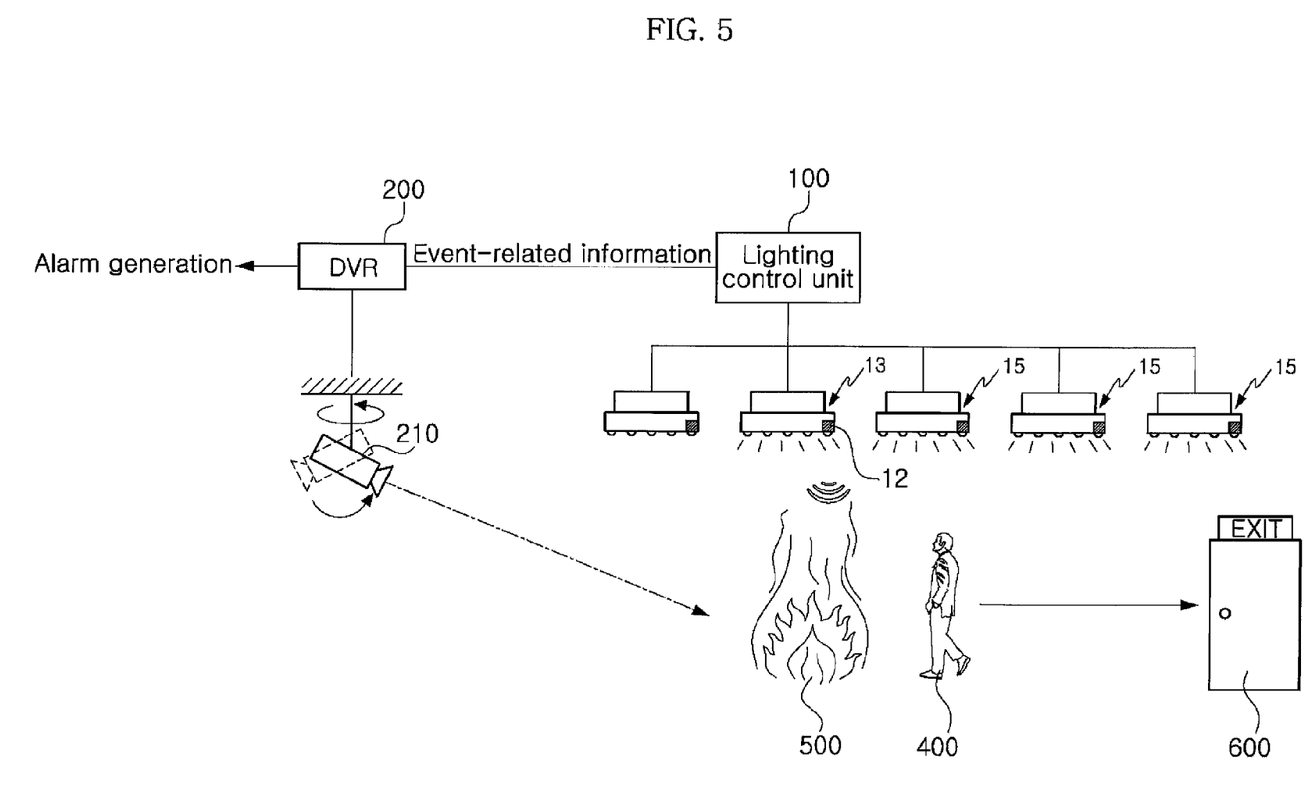
FIG. 5 is an operation conceptual view of a lighting control system with a CPTED-based security function based on an operation of a fire sensor according to an embodiment of the present invention.

First, as shown in FIGS. 4 and 5, the DVR unit 200 or the camera unit 300 received a signal of the corresponding operation contents according to the event can control a camera to face a lighting unit 13 providing the sensing information or increase its resolution according to the corresponding operation contents. That is, the DVR unit 200 or the camera unit 300 can obtain a higher quality video according to sensing of objects 400 and 500.

In addition, according to such event generation, the lighting control unit 100 can brighten other lightings adjacent the lighting unit 13 providing the sensing information in order to provide sufficient lighting to the sensing object 400 while increasing video photographing quality. As will be described later, such adjacent lighting control can be adjusted in different ways, such as brightening adjacent lightings in a sensing zone, brightening lightings on a route to an exit or an elevator, etc.

Accordingly, the DVR unit 200 or the camera unit 300 can acquire high resolution or extended high quality videos for objects from a camera, thereby easily distinguishing the objects 400 and 500 from each other and covering a shadow zone where the objects 400 and 500 may be located through PTZ or resolution adjustment of the camera.

In addition, the DVR unit 200 or the camera unit 300 can transmit an alarm signal to an established external device or system based on the alarm signal generation-related information included in the corresponding operation contents in order to alarm a system manager or an external control center.

In this case, the control unit 160 of the lighting control unit 100 can configure the event generation criterion in a step-wise manner to allow different levels of responses.

In the end, the DVR unit 200 or the camera unit 300 can be controlled, according to determination by the lighting control unit 100 on an event generated based on the sensing information of the sensor 12 included in the lighting unit 13 without a separate video analysis module, to sense intended objects 400 and 500 and acquire a high quality video, thereby implementing a lighting providing function in compliance with security function and situation.

In addition, the control unit 160 of the lighting control unit 100 can dim one or more lighting units 14 and 15 associated based on the associated lighting information included in the corresponding operation contents according to the event through the input/output unit 130. Accordingly, the control unit 160 can control the illuminance of the associated lighting units 14 and 15 to be different from the illuminance of other lighting units, thereby achieving attraction of attention, provision of illuminance for high quality video acquisition and route guidance.

Here, one or more different lighting IDs associated with the lighting ID of the lighting unit 10 generating the sensing information selected for change in ambient brightness and route guidance may be determined depending on type of the sensing information and the event determination criterion.

The event determination criterion may include one or more associated lighting IDs differently set for each lighting ID for attraction attention or route guidance depending on type, sensing level, position and environmental information of sensor unit 12 included in the lighting unit 10, and the associated lighting information (associated lighting ID, dimming information, lighting type, lighting time, etc.) for the associated lighting ID.

Accordingly, the control unit 160 can extract the event-related information when an event is generated, and, based on the associated lighting information included in the event-related information, control the lighting units 14 and corresponding to the associated lighting ID associated with the route guidance or the attraction attention based on the information of the lighting storage unit 152 of the DB unit 150, thereby carrying out the function of route guidance or attraction of attention based on the event-related information.

Here, the associated lighting information associated with the attraction of attention may be omitted. That is, if it is determined based on preset setting information that the sensing information is information associated with a change in ambient brightness, the control unit 160 can recognize a position of the lighting ID generating the sensing information serving as the basis of event generation from the lighting storage unit 152 of the DB unit 150 and dim another lighting unit 14 adjacent to the lighting unit 13 of the corresponding lighting ID, thereby increasing the brightness of the ambient lighting unit 14 adjacent to the lighting unit 13 of the corresponding lighting ID for attraction attention.

In addition, the control unit 160 can display an event generation spot by dimming the lighting unit 13 serving as the basis of event generation, differently from other lighting units.

An embodiment of control configuration of a lighting unit based on the above-described event-related information for attraction of attention or route guidance will be described in detail.

First, as shown in FIG. 4, since the lighting unit is provided with use for user recognition and trespassing prevention in a case where the sensing information is information related to object sensing, generated from a body sensor or a doppler sensor, it is preferable to set an associated lighting ID for one or more lighting units adjacent to the lighting unit from which the sensing information is generated, in the associated lighting information.

Accordingly, upon receiving the sensing information on object sensing, the control unit 160 can determine whether or not an event is generated, extract event-related information including associated lighting information attached with an associated lighting ID matching the lighting ID generating the sensing information serving as the basis of event generation, from the mapping table 151, and collate the extracted event-related information with the lighting storage unit 152, thereby identifying and dimming the lighting unit 13 generating the sensing information and the adjacent lighting unit 14. This can attract attention of an object and support to acquire a clear video from a camera, which can result in great improvement of security.

As another example, as shown in FIG. 5, since the lighting unit is provided with use for determination on occurrence of a disaster in a case where the sensing information is information generated from a fire sensor or a smoke sensor, it is preferable to set an associated lighting ID for the lighting unit 15 placed on a route to an exit 600 closest to a position of the lighting unit 13 generating the sensing information, in the associated lighting information.

Accordingly, upon receiving the sensing information on fire or smoke, the control unit 160 can determine whether or not an event is generated, based on the associated lighting information included in the event-related information, acquire an associated lighting ID attached to information of a route to the exit 600 closest to the position of the lighting unit 13 generating the sensing information serving as the basis of event generation, and dim the lighting unit 15 matching the corresponding associated lighting ID through the lighting storage unit 152. Of course, lighting control such as sequential light emission, lightening or the like is also possible.

Accordingly, a route from the position of the lighting unit 13 generating the sensing information to the exit can be guided and a fire outbreak spot can be correctly guided through lighting, thereby securing a field of view which may be blocked by smoke and allowing earlier fire suppression.

In addition, the control unit 160 of the lighting control unit 100 can control the external power receiving unit 110 and the power providing unit 120 to provide power corresponding to desired lighting to the input/output unit 130 and the dimmer unit 11 can dim the entire lighting unit through a dimming control signal received through the control line.

Based on the above-described configuration, depending on security nature of a spatial position corresponding to each lighting unit, a body sensor or a Doppler sensor can be applied if the spatial position is intended to prevent trespassing and a fire sensor or a smoke sensor can be applied to a space where disasters such as fire concerns, thereby providing different security functions for different positions in the space.

In addition, the sensor unit 12 included in the lighting unit 13 may be configured with different types of complex sensors, thereby allowing a body sensor and a fire sensor to be complexly installed at specific spots.

Accordingly, if body sensing and fire or smoke sensing are simultaneously generated, the objects 400 and 500 located at spots where a fire breaks out can be shot to confirm identity of the objects and a route from a spot of fire outbreak to the exit 600 can be guided, thereby allowing easy evacuation guidance or rescue for a person located at a spot of fire or smoke outbreak.

In addition, since sensor application/no application can be easily set without line change and accordingly additional sensors can be provided or the type of the sensor can be changed as necessary, it is possible to flexibly cope with various different purposes.

In the other hand, if the sensing information is not received in a certain period of time, the control unit 160 of the lighting control unit 100 can initialize the entire lightings with a preset dimming control setting of each lighting and transmit an initialization signal to the DVR unit 200 or the camera unit 300 via the communication unit 140 in order to return the camera operation based on the sensing information to its initial state.

Figure 6:
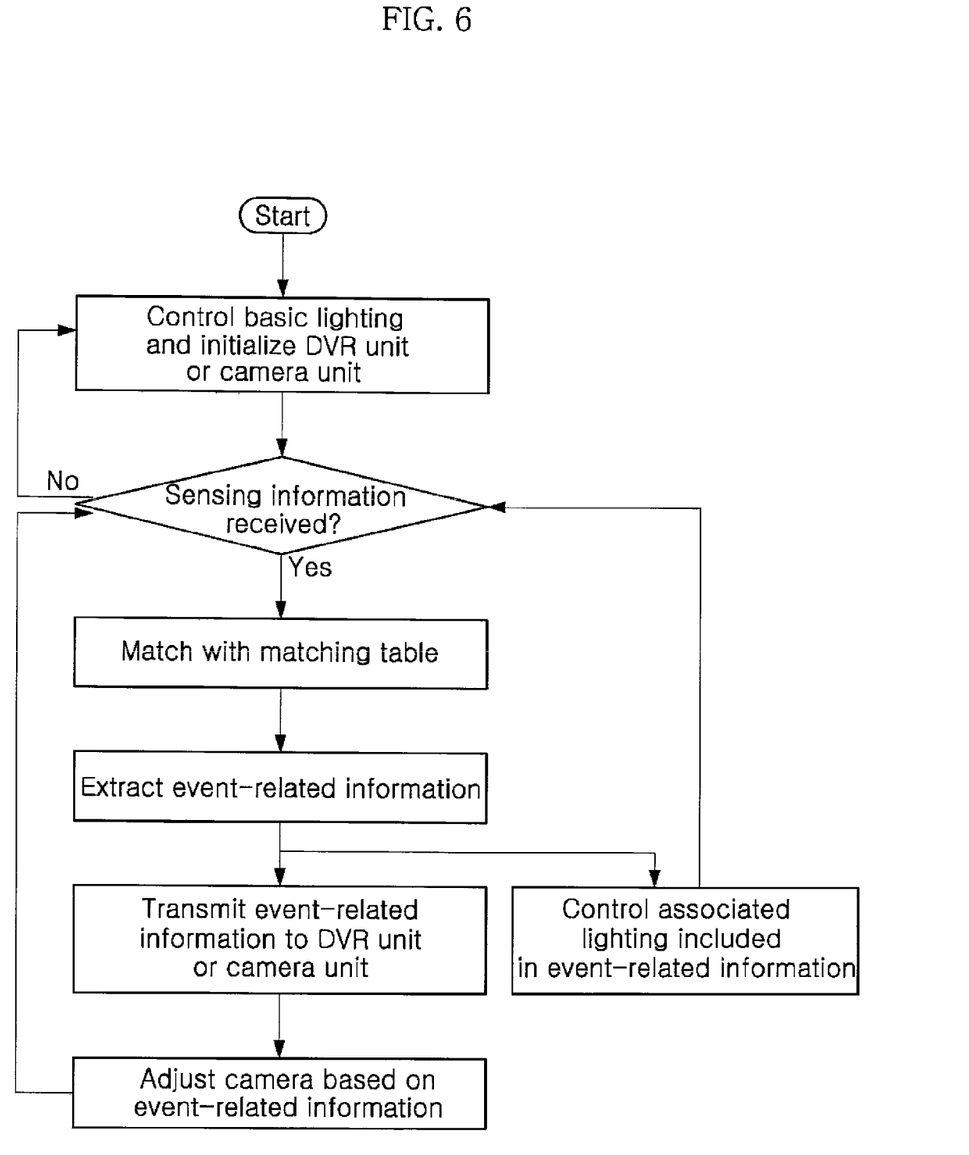
FIG. 6 is a flow chart of a lighting control method with a CPTED-based security function according to an embodiment of the present invention.

FIG. 6 is a flow chart showing an embodiment of a lighting control method of the lighting control system with the above-described security function. As shown, the lighting control unit dims the entire lighting depending a preset lighting control setting and one or more DVR units or camera units connected to the lighting control unit are operated with an initial setting.

Thereafter, upon receiving sensing information and a lighting ID from a lighting unit, the lighting control unit extracts event-related information matching the lighting ID and the sensing information and transmits a signal for corresponding operation contents according to the event-related information to the DVR unit or the camera unit.

Next, upon receiving the signal, the DVR unit or the camera unit can control a camera based on the received signal to acquire a high quality video for a sensing object and the lighting control unit can control lighting associated with the lighting generating the sensing information based the event-related information to adjust the ambient brightness of a position corresponding to the lighting generating the sensing information or provide guidance of a route from the position to the exit.

Thereafter, if sensing information is not received any longer, the lighting control unit can return the lighting under control to the preset lighting control setting and return a camera to the initial state by transmitting an initialization command to the DVR unit or the camera unit.

While the present invention has been particularly shown and described with reference to exemplary embodiments thereof, it will be understood by those skilled in the art that various changes in form and details may be made therein without departing from the spirit and scope of the present invention. The exemplary embodiments are provided for the purpose of illustrating the invention, not in a limitative sense. Thus, it is intended that the present invention covers the modifications and variations of this invention provided they come within the scope of the appended claims and their equivalents.

What is claimed is:

1. A lighting control system with a security function based a CPTED (Crime Prevention Through Environmental Design), comprising:
    a plurality of dimmer units which is installed in a lighting and is configured to control the lighting locally based on sensing information received from a sensor included in the lighting or control the lighting remotely according to an external control signal received via a control line for remote lighting control and transmit the sensing information, along with a lighting ID, to an external remote site via the control line for remote lighting control; and
    a lighting control unit configured to carry out a remote lighting control for the plurality of dimmer units according to a control signal provided via the control line for remote lighting control, determine whether or not a preset event is generated, based on the lighting ID and the sensing information provided from the dimmer units via the control line for remote lighting control, transmit the control signal for remote lighting control to one or more other lighting dimmer units based on the sensing information and a lighting ID corresponding to the sensing information when the event is generated, control a lighting adjacent to the lighting installed with a dimmer unit transmitting the sensing information serving as the basis of the event generation, and directly control a direction and resolution of a video unit corresponding to the lighting installed with the dimmer unit transmitting the sensing information serving as the basis of the event generation,
    wherein the lighting control unit returns the brightness of the entire lighting according to a preset initialization setting if the sensing information is not received any longer and returns the video unit to a state previous to the event generation.

2. The lighting control system according to claim 1, wherein the sensor is a single or complex sensor.

3. The lighting control system according to claim 1, wherein the lighting control unit transmits a series of general-purpose control signals to the video unit including a DVR unit or a camera unit when the event is generated, and directly controls a camera placed adjacent to the lighting serving as the basis of the event generation.

4. The lighting control system according to claim 3, wherein the lighting control unit includes a mapping table in which the lighting ID matches address information of the video unit and the lighting ID and the sensing information match the series of control signals, matches the lighting ID and the sensing information transmitted from the dimmer unit with the mapping table, and transmits the series of control signal to the corresponding video unit.

5. The lighting control system according to claim 4, wherein the series of control signals includes adjustment information used to adjust a resolution or PTZ of a camera matching the lighting ID, and information on whether or not an alarm signal is generated.

6. The lighting control system according to claim 5, wherein the lighting control unit is configured to transmit the adjustment information to the video unit, change a PTZ or resolution setting of the camera corresponding to the lighting ID, and acquire a high quality video for an object serving as the basis of event generation.

7. The lighting control system according to claim 6, wherein the video unit stores the high quality video.

8. The lighting control system according to claim 1, wherein the lighting control unit determines different events depending on the type of the sensor and selects one of control of a lighting adjacent to the lighting generating the sensing information, control of a lighting placed on a route from a position of the lighting generating the sensing information to an exit, and control of one or more adjacent lightings including light control of adjacent lightings.

9. The lighting control system according to claim 1, wherein the lighting control unit controls the brightness of a lighting selected according to the event generation differently from other lightings.

10. A method of controlling a lighting with a security function based on a CPTED (Crime Prevention Through Environmental Design), comprising:
    a first step in which a lighting control server connected, via a control line for remote lighting control, to a plurality of dimmers which is installed in a lighting and is configured to control the lighting locally based on sensing information received from a sensor included in the lighting or control the lighting remotely according to an external control signal received via the control line for remote lighting control receives the sensing information, along with a lighting ID, from the dimmers via the control line for remote lighting control;
    a second step in which the lighting control server determines whether or not a preset event is generated, based on the lighting ID and the sensing information provided from the dimmers via the control line for remote lighting control;
    a third step in which the lighting control server transmits the control signal for remote lighting control to one or more other lighting dimmers based on the sensing information and a lighting ID corresponding to the sensing information when the event is generated at the second step, controls a lighting adjacent to the lighting installed with a dimmer transmitting the sensing information serving as the basis of the event generation, and directly controls a direction and resolution of a video device corresponding to the lighting installed with the dimmer transmitting the sensing information serving as the basis of the event generation; and
    after the third step, a fourth step in which the lighting control server returns the brightness of the entire lighting according to a preset initialization setting if the sensing information is not received any longer and returns the video device to a state previous to the event generation.

11. The method according to claim 10, wherein the third step includes a step in which the lighting control server stored with a mapping table in which the lighting ID matches address information of the video device and the lighting ID and the sensing information match a series of control signals matches the lighting ID and the sensing information serving as the basis of the event generation through the second step with the mapping table, transmits the series of control signal extracted accordingly to the corresponding video device, and directly controls a camera according to the series of control signals.

12. The method according to claim 11, wherein the third step includes a step in which the lighting control server adjusts a PTZ or resolution setting for the camera of the video device according to the series of control signals and stores a high quality video provided from the adjusted camera in the corresponding video device.

13. The method according to claim 10, wherein the third step includes a step in which the lighting control server determines different events depending on the type of the sensor and selects one of control of a lighting adjacent to the lighting generating the sensing information, control of a lighting placed on a route from a position of the lighting generating the sensing information to an exit, and control of one or more adjacent lightings including light control of adjacent lightings.

* * * * *